United States Patent
Holmes

(10) Patent No.: US 8,454,344 B2
(45) Date of Patent: Jun. 4, 2013

(54) MAGNETIC CLAMP FOR UNDERWATER PELLETIZER

(76) Inventor: George A. Holmes, West Chicago, IL (US)

( * ) Notice: Subject to any disclaimer, the term of this patent is extended or adjusted under 35 U.S.C. 154(b) by 248 days.

(21) Appl. No.: 12/818,344

(22) Filed: Jun. 18, 2010

(65) Prior Publication Data
US 2010/0320628 A1 Dec. 23, 2010

Related U.S. Application Data

(60) Provisional application No. 61/218,858, filed on Jun. 19, 2009.

(51) Int. Cl.
*B28B 7/14* (2006.01)
(52) U.S. Cl.
USPC .............................. 425/313; 425/310; 264/5
(58) Field of Classification Search
USPC ........ 425/3, 6, 67, 313, 310, 182, 190; 264/5; 269/8
See application file for complete search history.

(56) References Cited

U.S. PATENT DOCUMENTS

| | | | | |
|---|---|---|---|---|
| 3,832,427 A * | 8/1974 | Mutch | | 264/39 |
| 4,910,633 A * | 3/1990 | Quinn | | 361/144 |
| 6,474,969 B1 * | 11/2002 | Ready et al. | | 425/67 |
| 7,148,776 B2 * | 12/2006 | Day et al. | | 335/289 |
| 2003/0197841 A1 * | 10/2003 | Araki et al. | | 355/50 |

* cited by examiner

*Primary Examiner* — Galen Hauth
(74) *Attorney, Agent, or Firm* — Clifford Kraft

(57) ABSTRACT

An underwater pelletizer is presented having an electromagnetic clamp that includes an electromagnetic ring body having a series of electromagnets disposed along a contact surface of the electromagnetic ring body. A clamping ring body has a series of mild steel inserts disposed along a contact surface of the clamping ring body, where each mild steel insert is disposed in a position complementary to at least one of the series of electromagnets. The electromagnetic clamp ring has a contact face with a series of electromagnets disposed therein and providing a clamping ring having a contact face with a series of mild steel inserts disposed therein, where the contact face of the clamping ring is configured to engage the contact face of the electromagnetic ring to form a seal and the mild steel inserts are positioned such that each one of the series of electromagnets is adjacent to one of the mild steel inserts when the contact faces of the electromagnetic and clamping rings are engaged. The method involves disposing the electromagnetic ring and the clamping ring between the water chamber and a die face, activating the series of electromagnets to clamp the electromagnetic ring to the clamping ring, and deactivating the series of electromagnets to gain access to the water chamber.

6 Claims, 6 Drawing Sheets

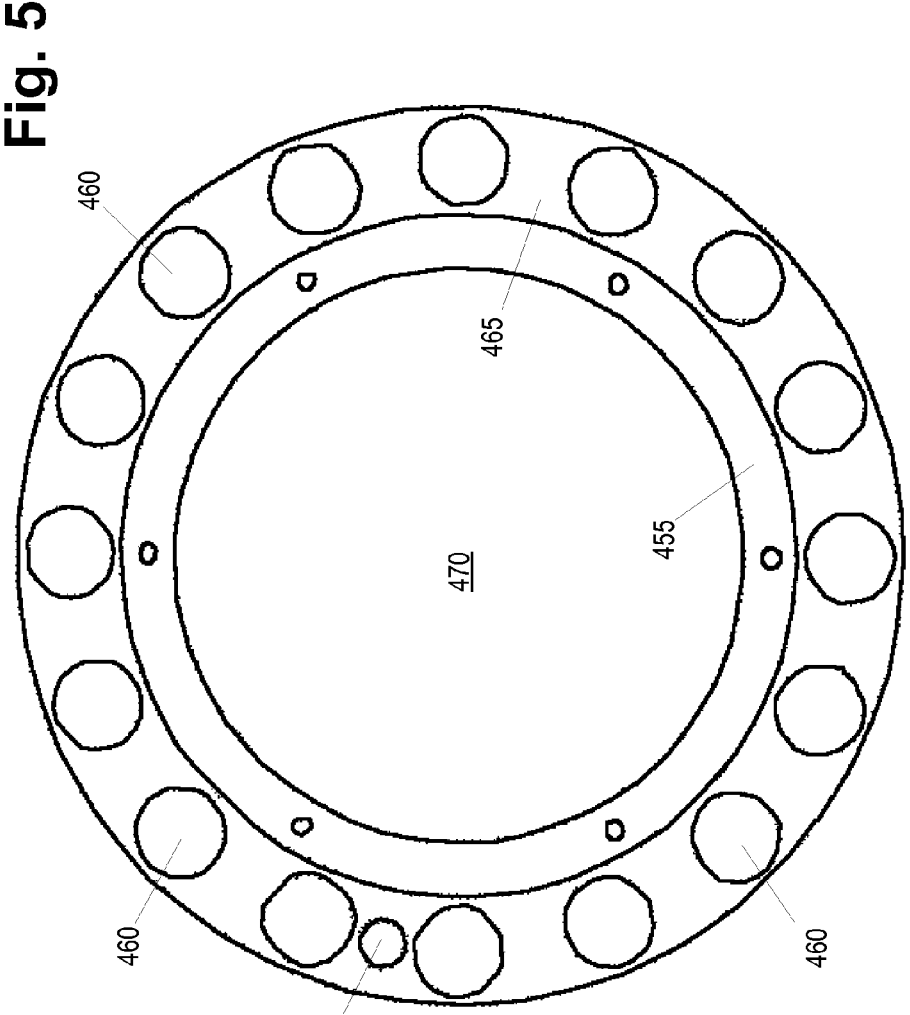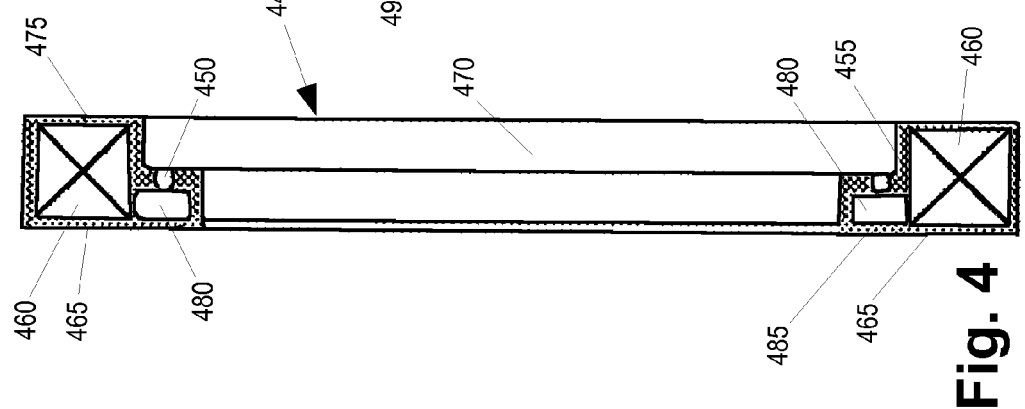

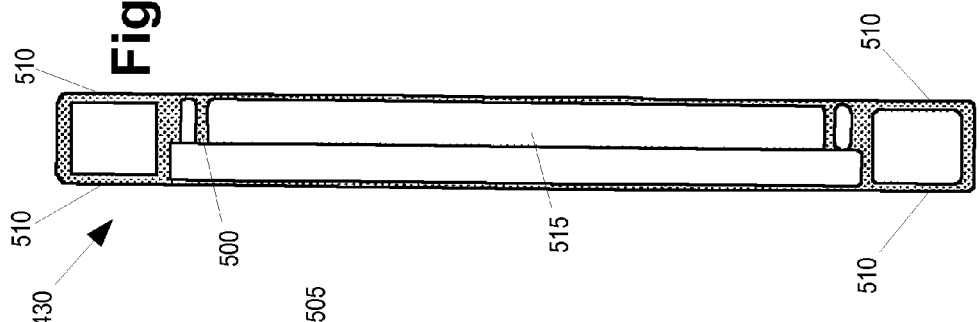
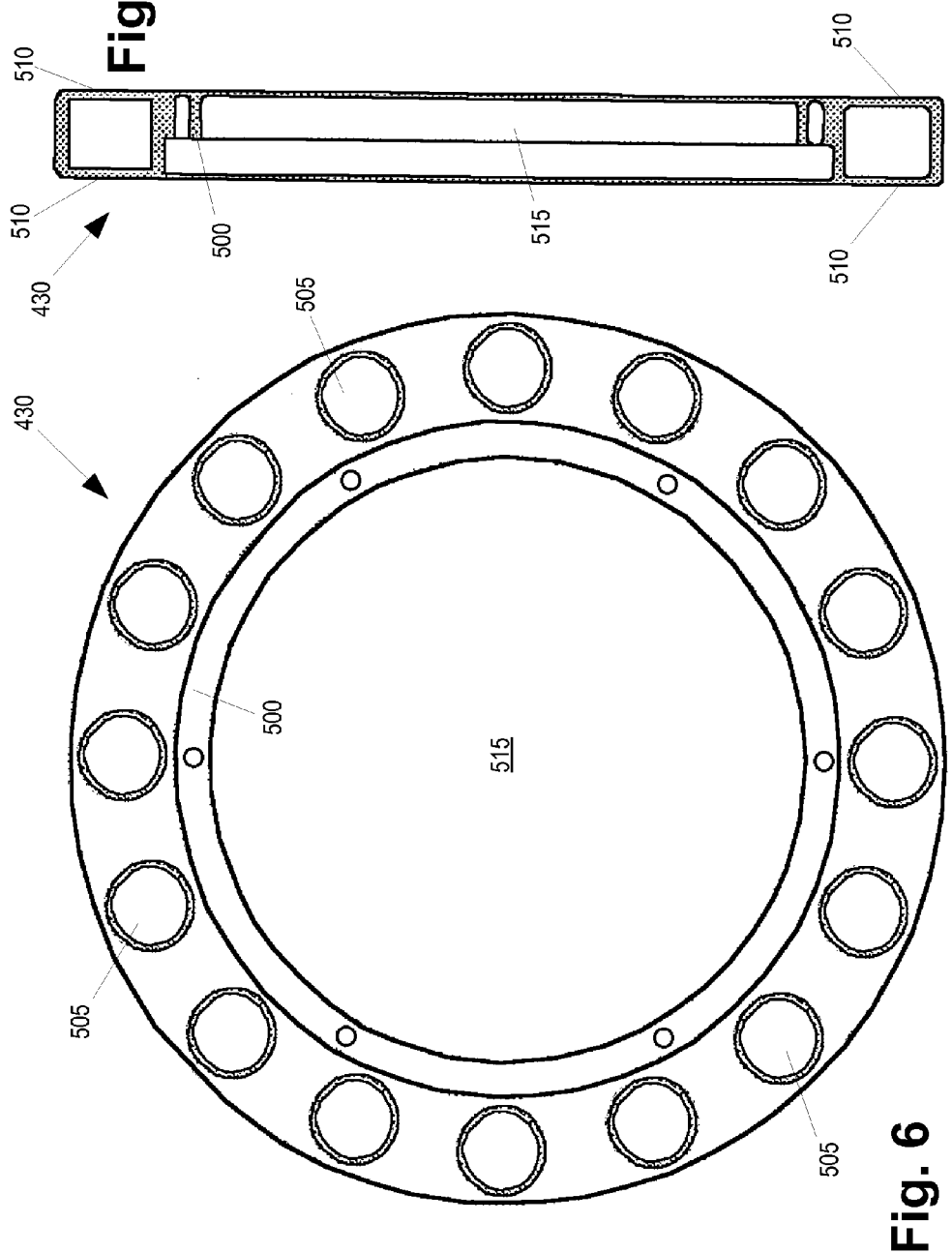

US 8,454,344 B2

MAGNETIC CLAMP FOR UNDERWATER PELLETIZER

CROSS REFERENCE TO PENDING APPLICATION

This application claims priority to U.S. provisional application Ser. No. 61/218,858 entitled "Magnetic Clamp for Underwater Pelletizer" filed Jun. 19, 2009 by George Holmes, the contents of which are herein incorporated by reference.

FIELD OF THE INVENTION

This invention pertains to underwater pelletizers and, more particularly, clamping mechanisms for use with underwater pelletizers.

BACKGROUND OF THE INVENTION

Extruders for extruding plastic material into a molten stream of plastic material have been known and used for some time. One particular use of such an extruder is in connection with a pelletizer assembly that is mounted to the end of the extruder. In such a combination of an extruder and a pelletizer, a die having a plurality of holes therein is mounted at the end of the extruder and at the entrance to the pelletizer assembly and forms part of both. The pelletizer then includes a rotating cutter assembly having cutting blades positioned adjacent the die face from which streams of molten plastic material flow. The rotating cutter assembly cuts the streams of plastic material into pellets of various sizes depending upon the extrusion flow rate through the holes in the die and the speed of rotation of the cutter assembly.

Also, the flow of water through the chamber serves to carry the pellets away from the chamber.

In such a combined extruder and pelletizer assembly it is desirable to provide means for gaining easy access to the water chamber for servicing the pelletizer, such as replacing worn cutting blades of the cutter assembly, to generally observe the formation of pellets by the rotating cutter assembly, and to clean the die.

U.S. Pat. No. 4,529,370 illustrates one example of a conventional underwater pelletizer.

Another example of a conventional underwater pelletizer is shown in U.S. Pat. No. 5,059,103. Some conventional components for pelletizers are shown in U.S. Pat. Nos. 4,621,996; 5,403,176; 5,624,688; and 6,332,765.

SUMMARY OF THE INVENTION

An embodiment of an electromagnetic clamp for an underwater pelletizer includes an electromagnetic ring body having a series of electromagnets disposed along a contact surface of the electromagnetic ring body. A clamping ring body has a series of mild steel inserts disposed along a contact surface of the clamping ring body, where each mild steel insert is disposed in a position complementary to at least one of the series of electromagnets.

An embodiment of a method for accessibly sealing a water chamber of an underwater pelletizer calls for providing an electromagnetic clamp ring having a contact face with a series of electromagnets disposed therein and providing a clamping ring having a contact face with a series of mild steel inserts disposed therein, where the contact face of the clamping ring is configured to engage the contact face of the electromagnetic ring to form a seal and the mild steel inserts are positioned such that each one of the series of electromagnets is adjacent to one of the mild steel inserts when the contact faces of the electromagnetic and clamping rings are engaged. The method involves disposing the electromagnetic ring and the clamping ring between the water chamber and a die face, activating the series of electromagnets to clamp the electromagnetic ring to the clamping ring, and deactivating the series of electromagnets to gain access to the water chamber.

BRIEF DESCRIPTION OF THE DRAWINGS

Certain aspects of the present invention will be described with reference to the following drawings, wherein:

FIG. 4 is a cross-sectional side view of an embodiment of a magnet ring of the electronic clamp of FIG. 3;

FIG. 5 is an end view illustrating of the embodiment of a magnet ring of FIG. 4;

FIG. 6 is an end view of an embodiment of a clamping ring of the electronic clamp of FIG. 3;

FIG. 7 is a cross-sectional side view of the magnet ring of FIG. 6; and

DETAILED DESCRIPTION

In underwater pelletizers, it is desirable to provide means for gaining easy access to the water chamber for servicing the pelletizer, such as replacing worn cutting blades of the cutter assembly, to generally observe the formation of pellets by the rotating cutter assembly, or to clean the die.

Figure 1:
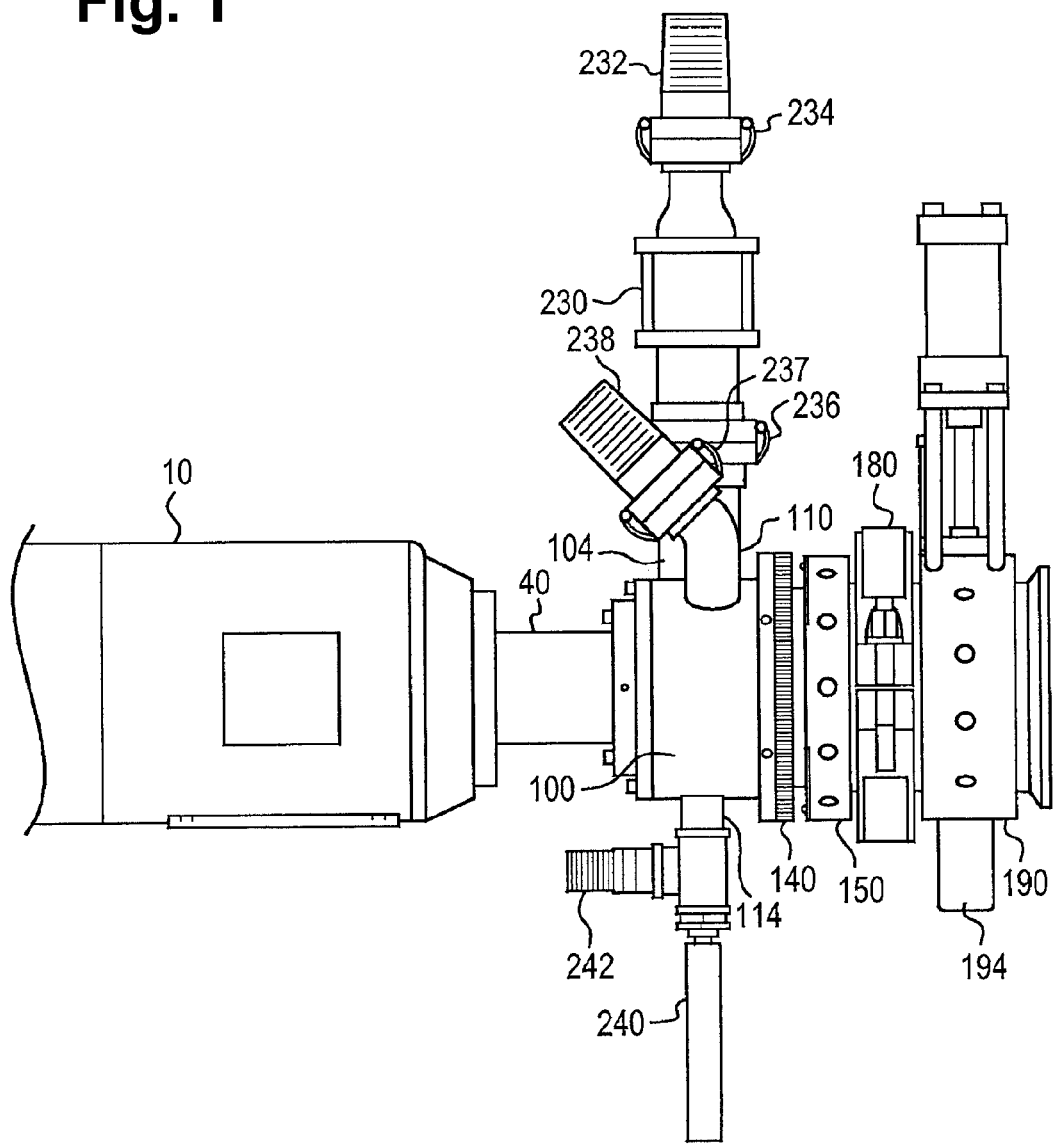
FIG. 1 is a schematic drawing illustrating a side view of an example of an underwater pelletizer having a mechanical clamp.

FIG. 1 is an assembled side view illustrating a portion of an underwater pelletizer having a mechanical clamping mechanism. This example of an underwater pelletizer is further described in U.S. Patent Appl. No. 60/814,659, herein incorporated by reference in its entirety for all purposes. The underwater pelletizer includes a water chamber housing 100 fixedly coupled to motor adaptor 40 and motor 10 along with associated water circulation ports. Flow sight 230, which allows water and pelletized material to be observed leaving water chamber housing 100, is coupled to water outlet 104 via cam and groove coupling 236 and on top is coupled to hose fitting 232 via cam and groove coupling 234, where hose fitting receives a water and pellet hose typically for transporting the resulting pelletized material to a pellet dryer. Water inlet 110 is coupled to hose fitting 238 via cam and groove coupling 237, where hose fitting 238 receives a water supply line. Pneumatic valve 240 is coupled to drain outlet 114 and has a hose fitting 242 for receiving a hose for draining water chamber housing 100.

Figure 2:
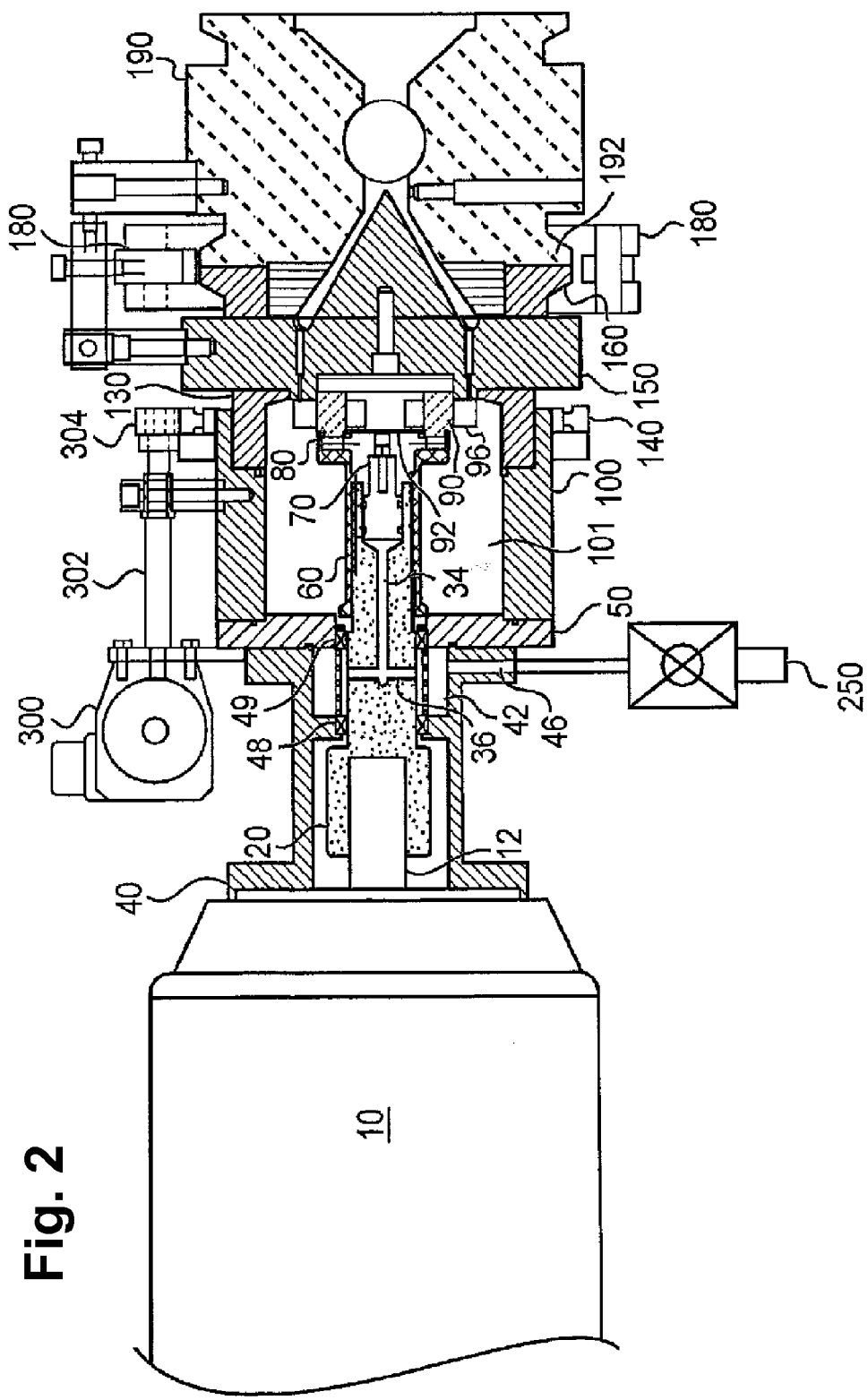
FIG. 2 is a cross-sectional view of the underwater pelletizer of FIG. 1 that illustrates an automated clamping component used to access a water chamber of the pelletizer.

FIG. 2 is an assembled cross-sectional view of the underwater pelletizer of FIG. 1 that also illustrates automated clamping and pressure actuation components. Motor 10 is secured to motor adaptor 30, which is secured to water chamber plate 50. Shaft extension 20 is coupled to motor shaft 12 and extends through high pressure chamber 42 formed within motor adaptor 30 along with shaft extension 20 and water chamber plate 50. Mechanical shaft seal 48 forms a high pressure seal between shaft extension 20 and motor adaptor 40. Mechanical shaft seal 49 forms a high pressure seal between shaft extension 20 and water chamber plate 50. In one example, mechanical shaft seals 48 and 49 are ceramic and graphite disc seals actuated by SS spring, which are widely used in other equipment applications.

A pressure regulator 250 (manual or electronic) is connected to supply port 46 and regulates the pressure in high pressure chamber 42. The pressure in high pressure chamber 42, in turn, affects the amount of force applied by hub piston 70 to pressure plate 2 of cutting hub 90 via pressure access hole 36 and axial bore 34. By controlling the pressure in high pressure air chamber 42, the amount of axial force applied by hub piston 70 to cutting hub 90 is controlled during pelletizer operation or blade lapping sequence.

Shaft extension 20 passes through water chamber plate 50 into water chamber 101 formed by water chamber housing 100. Cutter drive shaft 60 is fitted onto shaft extension 20 and is coupled to cutting hub 90 through flexible disc 80. The blades 96 of cutting hub 90 are pressed against the face of extrusion die 150 by hub piston 70. The extrusion die 150 is maintained at a temperature that is above the melting temperature above the material being pushed through the die. When motor shaft 12 rotates, shaft extension 20 also rotates causing cutter shaft 60, flexible disc 80 and cutting hub 90 to rotate in order to cut plastic extruded through holes in die 150.

In FIG. 2, mechanical clamp 180 is a hinged quick clamp for engaging die clamp adaptor 160, which is fastened to die 150, and a clamp flange 192 of diverter valve 190. The diverter valve 190 may be connected to an extruder (not shown) that provides a continuous flow of molten material to the diverter valve. An actuator 300 has a drive shaft 302 for rotationally driving driven gear 304. Driven gear 304 engages rotor 140 fastened to water chamber housing 100 in order to open or close water chamber 101. By automatically controlling actuator 300, pressure regulator 250, melt diverter valve 190 and water bypass system start-up and shut-down of the pelletizer can be fully automated.

Figure 3:
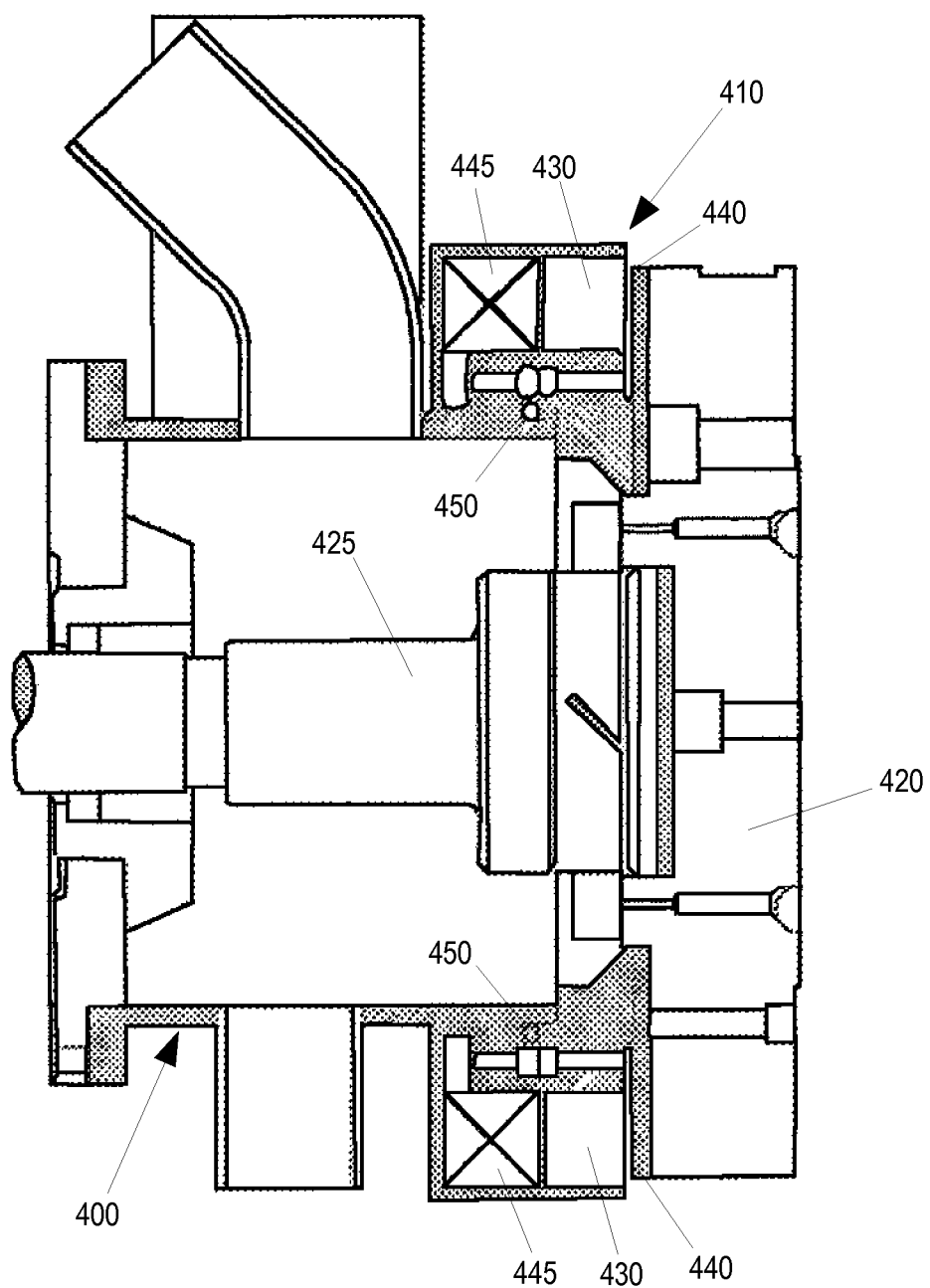
FIG. 3 is a schematic drawing illustrating a cross-sectional side view of an embodiment of a water chamber of an underwater pelletizer having an electromagnetic clamp.

FIG. 3 is a schematic drawing illustrating a cross-sectional side view of an embodiment of a water chamber of an underwater pelletizer having an electromagnetic clamp in accordance with the present invention. In contrast to the pelletizer shown in FIGS. 1 and 2, the underwater pelletizer of FIG. 3 features a water/fluid chamber 400 having an electromagnetic clamp 410 for clamping the water chamber to an extrusion die 420. The water chamber also includes a cutter 425 for cutting extruded plastic. The electromagnetic clamp 410 includes a clamping ring 430 that is fastened to the die, where thermal insulation 440 is preferably provided for thermally insulating the die from the clamping ring 430. The clamp also includes an electromagnetic ring 445 or plate fastened to the water chamber and configured to engage the clamping ring to form a seal. An O-ring seal 450 is preferably disposed in the electromagnetic ring 445 in one embodiment to help seal the water chamber when the electromagnetic clamp is activated and the electromagnets are energized. The O-ring is compressed to form a watertight seal between the fluid chamber and the heated die.

In operation, the electromagnetic ring is electrically activated to electromagnetically engage the clamping ring in order to seal the water chamber. When the electromagnetic ring is deactivated, the electromagnetic ring and clamping ring can be separated to gain access to the water chamber.

FIGS. 4 and 5 illustrate one embodiment of an electromagnetic ring 445 in accordance with the present invention. In this embodiment, the electromagnetic ring has an electromagnet ring body 455 in which is disposed a series of electromagnets 460 along a contact face 465 or surface of the electromagnet ring body where the electromagnetic ring will engage the clamping ring. The electromagnet ring body has an aperture or bore 470, circumscribed by the series of electromagnets 460, formed therein to provide access to the water chamber and for communication with a face of the die so that material extruded from the die face enters the water chamber when the underwater pelletizer is assembled and operating. In operation, the extruded material has a melting temperature and the temperature of the die is maintained above the melting temperature. Preferably, the temperature of the die is maintained at a temperature 50% greater than the melting temperature of the extruded material. The electromagnets are secured in the electromagnet ring body, in this embodiment, using high temperature epoxy seals 475. The electromagnets are wired to a source of electrical energy via a wire chamber 480 that is sealed using a stainless steel cover plate 485. In this embodiment, the electromagnetic ring includes a proximity sensor 490 that may be used by a controller to detect when the electromagnetic ring is in proximity with the clamping ring.

FIGS. 6 and 7 illustrate an embodiment of a clamping ring 430 or plate in accordance with the present invention for engaging the electromagnetic ring shown in FIGS. 4 and 5. In this embodiment, the clamping ring 430 has a clamping ring body 500 with a surface in which is disposed a series of mild steel inserts 505, or other ferromagnetic material, along a contact face of the clamping ring body where the electromagnetic ring will engage the clamping ring. The mild steel inserts are secured in the clamping ring body, in this embodiment, using high temperature epoxy seals 510. The clamping ring body also has an aperture or bore 515, circumscribed by the mild steel inserts 505, formed therein to provide access to the face of the die and communication from the die face to the water chamber so that material extruded from the die face enters the water chamber when the underwater pelletizer is assembled and operating.

Note that, in this embodiment, the electromagnets and mild steel inserts are aligned in complementarily positions along the contact face of the electromagnet ring body and the clamping ring body, respectively, so that, in operation, there is a mild steel insert in a position corresponding and adjacent to each electromagnet when the electromagnetic clamp is engaged. When the electromagnets are electrically activated, each electromagnet will produce an electromagnetic field that engages the corresponding mild steel insert. The electromagnetic attractive force between the electromagnets and the mild steel inserts will clamp the electromagnetic ring to the clamping ring to seal the water chamber. In one embodiment, the proximity sensor is used in a control process that prevents the electromagnets from being activated unless the presence of the clamping ring is detected. When the electromagnets are deactivated, then the electromagnetic and clamping rings can be separated to gain access to the water chamber.

Further note that while the electromagnet ring and clamping ring in the embodiment above are shown as being substantially circular in shape, this shape is selected to accommodate a water chamber that is substantially cylindrical. Other shapes maybe utilized as needed to accommodate underwater pelletizer equipment having a different shape or configuration. The shape of the rings, which may also be viewed as flanges, is generally selected to provide a seal between the water chamber and die assemblies when engaged.

Also, while the embodiment described above is illustrated with a electromagnetic ring fastened to the water chamber housing of an underwater pelletizer and the clamp ring fastened to a die assembly, one of ordinary skill in the art will readily recognize that the electromagnetic ring may be fastened to the die assembly and the clamp ring fastened to the water chamber without departing from the teachings of the present invention.

Figure 8:
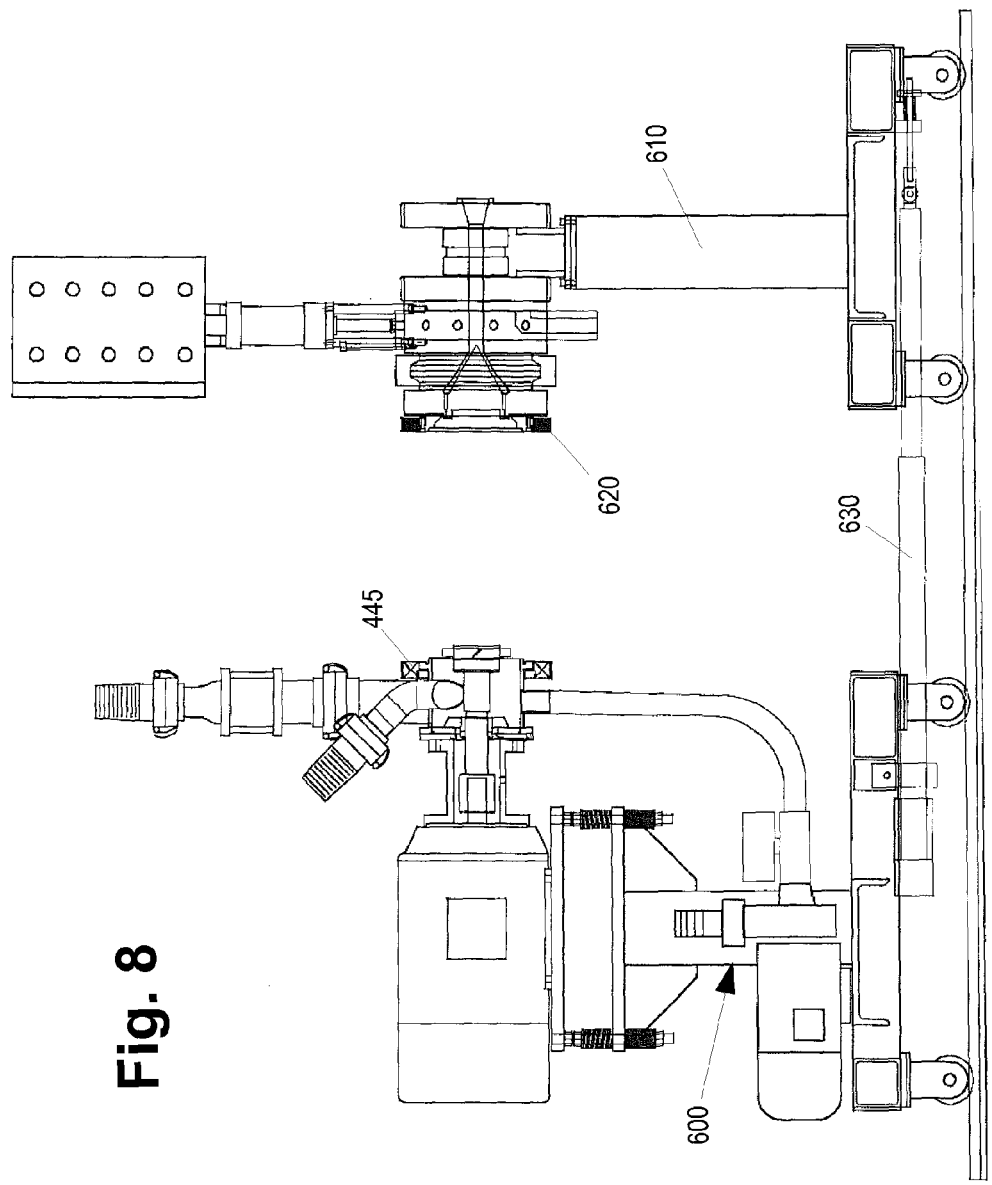
FIG. 8 is a side view of an embodiment of an underwater pelletizer utilizing the magnetic clamp assembly described above along with an actuator system.

FIG. 8 is a side view of an embodiment of an underwater pelletizer utilizing the magnetic clamp assembly described above along with an actuator system that couples a pelletizer stand 600 to a die stand 610. In this embodiment, the electromagnet ring 445 is fastened to the water chamber that is part of the pelletizer stand assembly. The clamping ring, which is a stainless steel flange with steel inserts 620 in this embodiment, is fastened to the die assembly that is part of the die stand. The actuator 630 provides for controlled movement of the pelletizer stand and die stand with respect to one another.

In a preferred embodiment, the actuator moves axially along an axis that is parallel to an axis along which water chamber and die assemblies are aligned. Thus, when the actuator is activated to pull the pelletizer stand and die stand together, the electromagnet ring and clamp ring of the magnetic clamp assembly will meet in alignment such that the water chamber is sealed and the electromagnets in the electromagnet ring are positioned adjacent to the steel inserts in the clamp ring. Control of the actuator may preferably be combined with control of the electromagnets such that the controller system stops the actuator when the proximity sensor indicates that the electromagnet ring and clamp ring are in proximity with one another and the controller system then activates the electromagnets to engage the magnetic clamp. Conversely, for a clean out cycle, the controller system may, for example, deactivate the electromagnets before activating the actuator to separate the pelletizer stand and die stand assemblies.

The control function described above may also be preferably combined with the operation of other components of the underwater pelletizer system. For example, the controller system may be configured to also control a diverter valve controlling the flow of molten plastic to the die face, a cutter motor or hub for cutting extruded plastic, the flow of water to the water chamber, and a clean out port of the water chamber. In one scenario related to this example, the underwater pelletizer system is initialized to a state where the water chamber is open, the diverter valve is set to divert the flow of plastic away from the die face, water flow to the water chamber is stopped, the clean out port is open, and the rotation of the cutter motor or hub is stopped.

In an operation to close the chamber, in this example, the actuator is activated to pull the pelletizer and die stands together until the proximity sensor indicates that the electromagnet and clamp rings are in proximity, at which point the actuator is stopped. The electromagnets are then activated to clamp the electromagnet ring to the clamp ring. Water flow to the water chamber is started, rotation of the cutter motor or hub is started, the diverter valve is switched to flow plastic to the die face, and the clean out port is closed. At this point, the underwater pelletizer is actively pelletizing plastic.

In an operation to open the chamber, in this example, the diverter valve is set to divert, water flow to the chamber is stopped, rotation of the cutter motor or hub is stopped, the clean out port is opened to drain off remaining water and plastic material, the electromagnets are deactivated, and the actuator activated to separate the pellet and die stands and open the water chamber. Other variations to these operations are possible without departing from the scope of the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. Preferred embodiments of this invention are described herein, including the best mode known to the inventors for carrying out the invention. It should be understood that the illustrated embodiments are exemplary only, and should not be taken as limiting the scope of the invention.

I claim:

1. An underwater pelletizer comprising
a water chamber, filled with water, having an aperture;
a heated die for providing a continuous flow of molten material into the water chamber through the aperture;
an electromagnetic clamp having
a first ring mechanically secured to the water chamber around the aperture,
a second ring mechanically secured to the heated die, wherein the first ring is magnetically secured to the second ring;
an O-ring circumscribing the aperture, wherein a portion of the O-ring is contacting the water; and
one of the first or second rings having a plurality of electromagnets circumscribing both the aperture and the O-ring;
a proximity sensor in the first ring measuring the proximity of the first ring to the second ring.

2. The underwater pelletizer of claim 1 further comprising the other of the first or second rings having a plurality of metal inserts circumscribing both the aperture and the O-ring;
wherein each of plurality of metal inserts is adjacent to one of the plurality of electromagnets.

3. The underwater pelletizer of claim 1 further comprising an insulator between the electromagnetic clamp and the heated die, the insulator thermally insulating the electromagnetic clamp from the heated die.

4. An underwater pelletizer comprising
a water chamber, filled with water, having an aperture;
a heated die for providing a continuous flow of molten material into the water chamber through the aperture;
an electromagnetic clamp having
a first ring mechanically secured to the water chamber around the aperture,
a second ring mechanically secured to the heated die, wherein the first ring is magnetically secured to the second ring;

an O-ring circumscribing the aperture with one of the first or second rings having a plurality of electromagnets circumscribing both the aperture and the O-ring;

a proximity sensor in the first ring measuring the proximity of the first ring to the second ring.

5. The underwater pelletizer of claim 4 further comprising the other of the first or second rings having a plurality of metal inserts circumscribing both the aperture and the O-ring;

wherein each of plurality of metal inserts is adjacent to one of the plurality of electromagnets.

6. The underwater pelletizer of claim 4 further comprising an insulator between the electromagnetic clamp and the heated die, the insulator thermally insulating the electromagnetic clamp from the heated die.

\* \* \* \* \*